(12) United States Patent
Imoto et al.

(10) Patent No.: US 8,209,169 B2
(45) Date of Patent: *Jun. 26, 2012

(54) SYNCHRONIZATION OF AN INPUT TEXT OF A SPEECH WITH A RECORDING OF THE SPEECH

(75) Inventors: Noriko Imoto, Kanagawa (JP); Tetsuya Uda, Kanagawa (JP); Takatoshi Watanabe, Kanagawa (JP)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/279,479

(22) Filed: Oct. 24, 2011

(65) Prior Publication Data

US 2012/0041758 A1    Feb. 16, 2012

Related U.S. Application Data

(63) Continuation of application No. 12/145,804, filed on Jun. 25, 2008, now Pat. No. 8,065,142.

(30) Foreign Application Priority Data

Jun. 28, 2007    (JP) .................................. 2007-170113

(51) Int. Cl.
*G10L 15/00*    (2006.01)
(52) U.S. Cl. ......... 704/231; 704/249; 704/260; 704/255
(58) Field of Classification Search .................. 704/231, 704/235, 260, 258, 246–255, 270, 270.1
See application file for complete search history.

(56) References Cited

U.S. PATENT DOCUMENTS

| | | |
|---|---|---|
| 5,535,063 A | 7/1996 | Lamming |
| 5,598,507 A | 1/1997 | Kimber et al. |
| 5,606,643 A | 2/1997 | Balasubramanian et al. |
| 5,649,060 A | 7/1997 | Ellozy et al. |
| 5,655,058 A | 8/1997 | Balasubramanian et al. |
| 5,659,662 A | 8/1997 | Wilcox et al. |
| 5,717,869 A | 2/1998 | Moran et al. |
| 5,850,629 A | 12/1998 | Holm et al. |

(Continued)

FOREIGN PATENT DOCUMENTS

EP    0495612 B1    4/1996

(Continued)

OTHER PUBLICATIONS

Bett et al., "Multimodal Meeting Tracker. In: Proceedings of RIAO", Paris, France (2000).
Jacobson et al., "Linguistic Documents Synchronizing Sound and Text", Speech Communication 33 (1-2), pp. 79-96 (2001).
Kimber et al., "Speaker Segmentation for Browsing Recorded Audio", (1995).

(Continued)

*Primary Examiner* — Huyen X. Vo
(74) *Attorney, Agent, or Firm* — Wolf, Greenfield & Sacks, P.C.

(57) ABSTRACT

A method and system for synchronizing words in an input text of a speech with a continuous recording of the speech. A received input text includes previously recorded content of the speech to be reproduced. A synthetic speech corresponding to the received input text is generated. Ratio data including a ratio between the respective pronunciation times of words included in the received text in the generated synthetic speech is computed. The ratio data is used to determine an association between erroneously recognized words of the received text and a time to reproduce each erroneously recognized word. The association is outputted in a recording medium and/or displayed on a display device.

21 Claims, 10 Drawing Sheets

U.S. PATENT DOCUMENTS

| | | | |
|---|---|---|---|
| 6,076,059 A * | 6/2000 | Glickman et al. | 704/260 |
| 6,263,308 B1 * | 7/2001 | Heckerman et al. | 704/231 |
| 6,332,122 B1 | 12/2001 | Ortega et al. | |
| 6,332,147 B1 | 12/2001 | Moran et al. | |
| 6,434,520 B1 | 8/2002 | Kanevsky et al. | |
| 6,490,553 B2 | 12/2002 | Van Thong et al. | |
| 6,505,153 B1 | 1/2003 | Van Thong et al. | |
| 6,714,909 B1 | 3/2004 | Gibbon et al. | |
| 7,298,930 B1 | 11/2007 | Erol et al. | |
| 7,676,373 B2 | 3/2010 | Miyamoto et al. | |
| 2002/0161804 A1 | 10/2002 | Chiu et al. | |
| 2002/0193895 A1 | 12/2002 | Qian et al. | |
| 2006/0100877 A1 | 5/2006 | Zhang et al. | |
| 2006/0294453 A1 | 12/2006 | Hirata | |

FOREIGN PATENT DOCUMENTS

| | | |
|---|---|---|
| JP | 11-162152 | 6/1999 |
| JP | 2005-258198 | 9/2005 |
| JP | 2007-133052 | 5/2007 |

OTHER PUBLICATIONS

Kimber et al., "Acoustic segmentation for Audio Browsers," in Proc. Interface Conf. Sydney, Australia (Jul. 1996).

Kubala et al., "Rough 'n' Ready: A Meeting Recorder and Browser", ACM Computing Surveys, vol. 31, No. 7, (Sep. 1999) Article No. 7.

Lu et al., "A Robust Audio Classification and Segmentation Method", (2001).

Roy et al., "Audio Meeting History Tool: Interactive Graphical User-Support for Virtual Audio Meetings. In Proceedings of the ESCA workshop: Accessing information in spoken audio", (Apr. 1999) Cambridge Unversity pp. 107-110. available from http://svrwww.eng.cam.ac.uk/Aajr/esca99/.

Waibel et al., "Advances in Automatic Meeting Record Creation and Access: in Proceedings of ICASSP", (May 2001).

Japanese Office Action from Japanese Application No. 2007-170113 dated Feb. 21, 2012.

* cited by examiner

A New Driving Road For Cars ···

100

| WORD | STARTING TIME | ENDING TIME |
|---|---|---|
| A | 1.0 | 1.1 |
| New | 1.1 | 1.4 |
| Driving | 1.4 | 1.8 |
| Road | 1.8 | 2.7 |
| For | 2.7 | 2.9 |
| Cars | 2.9 | 3.1 |
| ⋮ | ⋮ | ⋮ |

SYNCHRONIZATION OF AN INPUT TEXT OF A SPEECH WITH A RECORDING OF THE SPEECH

CROSS REFERENCE TO RELATED APPLICATIONS

This application is a continuation of U.S. patent application Ser. No. 12/145,804 entitled "Synchronization of an Input Text of a Speech with a Recording of the Speech," filed Jun. 25, 2008, which is incorporated herein by reference in its entirety.

FIELD OF THE INVENTION

The present invention relates to a technique of displaying content of a speech in synchronization with reproduction of the speech, and more particularly, to a technique of displaying, in synchronization with speech reproduction, a text having speech content previously recorded.

BACKGROUND OF THE INVENTION

Current techniques for accurately outputting a speech reading a text while displaying the text are inefficient. Accordingly, there is a need for a method and system for accurately outputting a speech reading a text while displaying the text.

SUMMARY OF THE INVENTION

The present invention provides a method for synchronizing words in an input text of a speech with a continuous recording of the speech, said method implemented by execution of instructions by a processor of a computer system, said instructions being stored on computer readable storage media of the computer system, said method comprising:

generating a first dictionary stored in a first dictionary database of the computer system, said first dictionary comprising the words in the input text and associated first pronunciation speech data;

receiving input speech data encompassing the speech and being structured as a waveform obtained from the continuous recording of the speech spoken by a speaker reading the speech;

performing a first speech recognition of the input speech data, by comparing the input speech data with the first pronunciation speech data in the first dictionary, to generate a first recognition text comprising recognized words of the input text;

determining, from comparing the input text with the first recognition text, first erroneous recognition text comprising words of the input text erroneously recognized during performing the first speech recognition and not matching respective words of the first recognition text;

performing a second speech recognition of a first portion of the input speech data, corresponding to the first erroneous recognition text, to generate a second recognition text comprising recognized words of the first portion of the input speech data;

determining, from comparing the second recognition text with the first erroneous recognition text, second erroneous recognition text comprising words of the first erroneous recognition text differing from the words of second recognition text;

generating synthetic speech data corresponding to the second erroneous recognition text;

determining a second portion of the input speech data to which each word of the synthetic speech data corresponds;

computing, from the second portion of the input speech data to which each word of the synthetic speech data corresponds, ratio data comprising a ratio of a pronunciation time in the input speech data of each word of the second erroneous recognition text to a pronunciation time in the input speech data of each other word of the second erroneous recognition text;

determining, through use of the computed ratio data, a first association between each word of the second erroneous recognition text and a time to reproduce each portion of the input speech data corresponding to said each word of the second erroneous recognition text; and recording the first association in a recording medium of the computer system and/or displaying the first association on a display device of the computer system.

The present invention provides a computer program product, comprising a computer readable storage medium having a computer readable program code stored therein, said computer readable program code containing instructions that when executed by a processor of a computer system implement a method for synchronizing words in an input text of a speech with a continuous recording of the speech, said method comprising:

generating a first dictionary stored in a first dictionary database of the computer system, said first dictionary comprising the words in the input text and associated first pronunciation speech data;

receiving input speech data encompassing the speech and being structured as a waveform obtained from the continuous recording of the speech spoken by a speaker reading the speech;

performing a first speech recognition of the input speech data, by comparing the input speech data with the first pronunciation speech data in the first dictionary, to generate a first recognition text comprising recognized words of the input text;

determining, from comparing the input text with the first recognition text, first erroneous recognition text comprising words of the input text erroneously recognized during performing the first speech recognition and not matching respective words of the first recognition text;

performing a second speech recognition of a first portion of the input speech data, corresponding to the first erroneous recognition text, to generate a second recognition text comprising recognized words of the first portion of the input speech data;

determining, from comparing the second recognition text with the first erroneous recognition text, second erroneous recognition text comprising words of the first erroneous recognition text differing from the words of second recognition text;

generating synthetic speech data corresponding to the second erroneous recognition text;

determining a second portion of the input speech data to which each word of the synthetic speech data corresponds;

computing, from the second portion of the input speech data to which each word of the synthetic speech data corresponds, ratio data comprising a ratio of a pronunciation time in the input speech data of each word of the second erroneous recognition text to a pronunciation time in the input speech data of each other word of the second erroneous recognition text;

determining, through use of the computed ratio data, a first association between each word of the second erroneous recognition text and a time to reproduce each portion of the input speech data corresponding to said each word of the second erroneous recognition text; and recording the first association in a recording medium of the computer system and/or displaying the first association on a display device of the computer system.

The present invention provides a computer system comprising a processor and a computer readable memory unit coupled to the processor, said memory unit containing instructions that when executed by the processor implement a method for synchronizing words in an input text of a speech with a continuous recording of the speech, said method comprising:

generating a first dictionary stored in a first dictionary database of the computer system, said first dictionary comprising the words in the input text and associated first pronunciation speech data;

receiving input speech data encompassing the speech and being structured as a waveform obtained from the continuous recording of the speech spoken by a speaker reading the speech;

performing a first speech recognition of the input speech data, by comparing the input speech data with the first pronunciation speech data in the first dictionary, to generate a first recognition text comprising recognized words of the input text;

determining, from comparing the input text with the first recognition text, first erroneous recognition text comprising words of the input text erroneously recognized during performing the first speech recognition and not matching respective words of the first recognition text;

performing a second speech recognition of a first portion of the input speech data, corresponding to the first erroneous recognition text, to generate a second recognition text comprising recognized words of the first portion of the input speech data;

determining, from comparing the second recognition text with the first erroneous recognition text, second erroneous recognition text comprising words of the first erroneous recognition text differing from the words of second recognition text;

generating synthetic speech data corresponding to the second erroneous recognition text;

determining a second portion of the input speech data to which each word of the synthetic speech data corresponds;

computing, from the second portion of the input speech data to which each word of the synthetic speech data corresponds, ratio data comprising a ratio of a pronunciation time in the input speech data of each word of the second erroneous recognition text to a pronunciation time in the input speech data of each other word of the second erroneous recognition text;

determining, through use of the computed ratio data, a first association between each word of the second erroneous recognition text and a time to reproduce each portion of the input speech data corresponding to said each word of the second erroneous recognition text; and recording the first association in a recording medium of the computer system and/or displaying the first association on a display device of the computer system.

BRIEF DESCRIPTION OF THE DRAWINGS

FIG. 4 shows a concrete example of time stamp data, according to embodiments of the present invention.

DETAILED DESCRIPTION OF THE INVENTION

Figure 1:
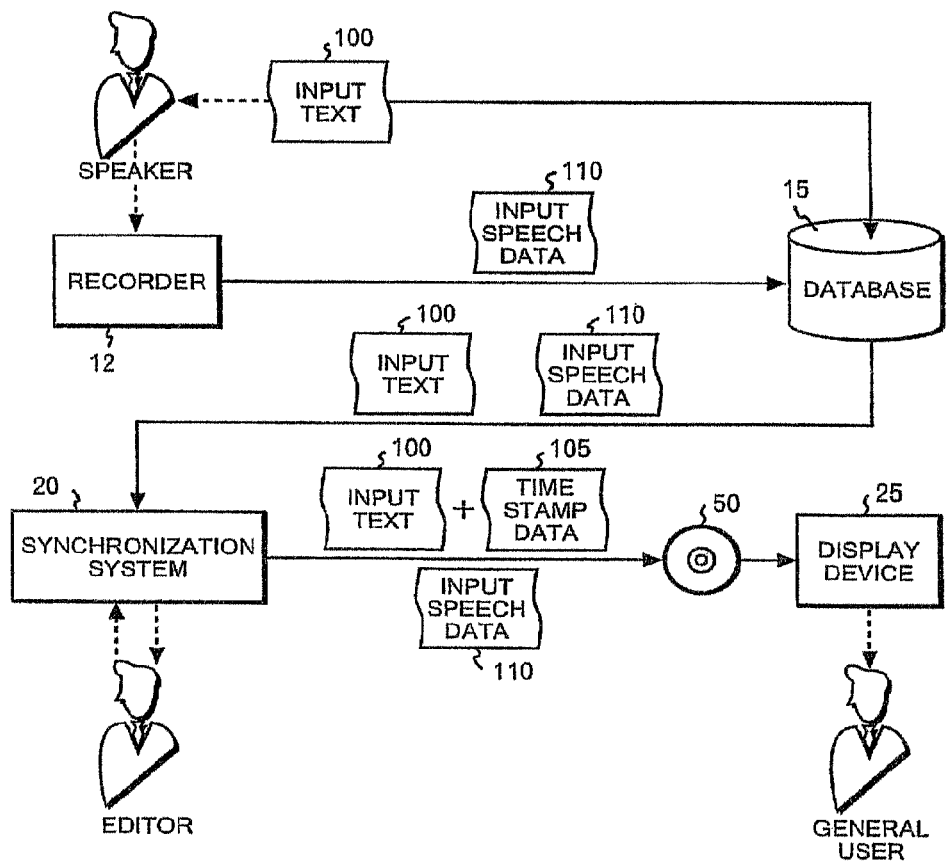
FIG. 1 shows an information system, according to an embodiment of the present invention.

FIG. 1 shows an entire configuration of an information system 10 according to this embodiment. The information system 10 includes a recorder 12, a database 15, a synchronization system 20 and a display device 25. The recorder 12 generates input speech data 110 by recording a speech of a speaker reading a previously set input text 100. The database 15 stores the generated input speech data 110 and the input text 100. The synchronization system 20 acquires the input text 100 and the input speech data 110 from the database 15. Thereafter, the synchronization system 20 estimates a pronunciation timing of each phrase in a speech to be reproduced in order to display the input text 100 having speech contents previously recorded therein in synchronization with reproduction of the input speech data 110. The estimation result may be displayed to an editor or may be changed by an input from the editor. Moreover, the estimation result is associated, as time stamp data 105, with the input text 100 and then recorded on a recording medium 50 together with the input speech data 110. Alternatively, the estimation result may also be transmitted to the display device 25 through a telecommunication line.

The display device 25 reads the input text 100, the time stamp data 105 and the input speech data 110 from the recording medium 50. Thereafter, the display device 25 displays the input text 100 in synchronization with reproduction of the input speech data 110. Specifically, every time a length of time that has elapsed since start of reproduction reaches time at which the time stamp data 105 is recorded in association with each phrase, the display device 25 displays a phrase corresponding to the time so that the word can be distinguished from other phrases. As an example, the display device 25 may display a phrase corresponding to a speech that is being reproduced by coloring the phrase in a color different from those of other phrases. Thus, a general user who studies a language or watches TV programs can accurately recognize a phrase that is being pronounced on a screen.

The information system 10 according to this embodiment is intended to highly accurately detect the pronunciation timing of a phrase, for which specification of the pronunciation timing has been difficult to perform by use of the conventional technique, in the technique of synchronizing reproduction of the speech data with display of the text as described above.

Figures 2, 3:
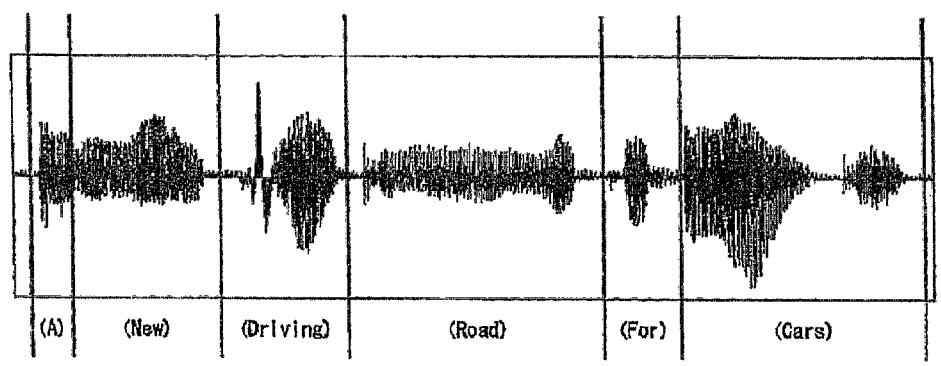
FIG. 2 shows a concrete example of an input text, according to embodiments of the present invention.
FIG. 3 shows a concrete example of input speech data, according to embodiments of the present invention.

FIG. 2 shows a concrete example of the input text 100 according to this embodiment. In the input text 100, contents of a speech to be reproduced are previously recorded. As an example, the input text 100 is a character string containing an English sentence "A New Driving Road For Cars". As the input text 100, a text in which each word is separated with a space, as in the case of the above English sentence, may be recorded. Alternatively, in the input text 100, character strings in a language for which separation of words is not specified, such as Japanese, Chinese and Korean, may also be recorded. Moreover, the phrase does not have to be one word but may include a number of words such as compound words and lines. Furthermore, the phrase may also be a character string of some grammatical words, such as one of a plurality of character strings connected with hyphens, for example.

FIG. 3 shows a concrete example of the input speech data 110 according to this embodiment. The input speech data 110 is, for example, data obtained by recording an utterance of the speaker. The data is expressed as waveform data, in which passage of time is shown in the horizontal axis and speech amplitude is shown in the vertical axis. For illustrative purposes, FIG. 3 shows the waveform data separated for each word in conjunction with the character string containing the words. However, the input speech data 110 is one obtained by merely recording the continuously pronounced speech. Thus, it is impossible to identify at the time of recording to which words in the input text 100 respective portions of the pronunciation actually correspond.

FIG. 4 shows a concrete example of the time stamp data 105 according to this embodiment. The time stamp data 105 is data obtained by associating time at which each of a plurality of words included in the input text 100 is pronounced in the input speech data 110 with each of the words. For example, in the time stamp data 105, starting time and ending time of pronunciation of each word, which are estimated from start of reproduction of the input speech data 110, are recorded as the time at which the word is pronounced. As an example, regarding the word "Driving" in the input text 100, pronunciation starting time thereof is 1.4 seconds after start of reproduction and pronunciation ending time thereof is 1.8 seconds after start of reproduction. As described above, as long as pronunciation starting and ending times for each of the words in the input text 100 can be found out, the display device 25 can accurately determine which word is now being pronounced by measuring time that has elapsed since start of reproduction of the input speech data 110. As a result, display in synchronization with reproduction of the input speech data 110 can be achieved, such as display of each of the words in the input text 100 by coloring the word.

Note that, when starling time of each word coincides with ending time of a word immediately before the word, one of starting and ending times of pronunciation of each word may be recorded in the time stamp data 105. In reality, when there is punctuation between the words in the input text 100, it is desirable to provide silent time called a pause between pronunciations of those words. In this case, the pronunciation starting time of each word does not coincide with pronunciation ending time of a word immediately before the word. In such a case, it is desirable to record both of the starting and ending times of pronunciation of each word in the time stamp data 105.

Figure 5:
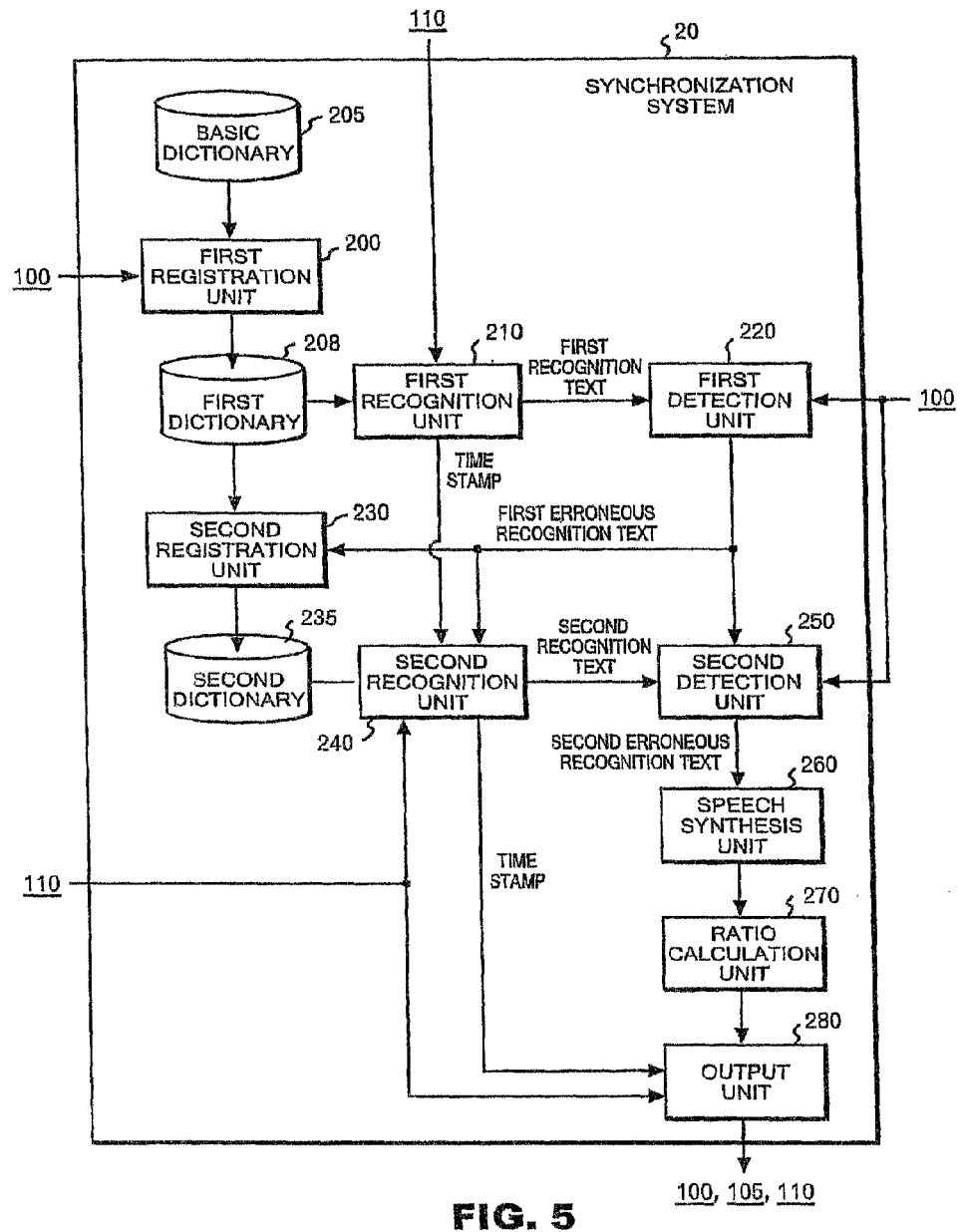
FIG. 5 shows a functional configuration of a synchronization system, according to embodiments of the present invention.

FIG. 5 shows a functional configuration of the synchronization system 20 according to this embodiment. The synchronization system 20 has a function of determining the pronunciation timing of each of the words included in the input text 100 based on the received input text 100 and input speech data 110. Specifically, the synchronization system 20 includes a first registration unit 200, a basic dictionary database 205, a first dictionary database 208, a first recognition unit 210, a first detection unit 220, a second registration unit 230, a second dictionary database 235, a second recognition unit 240, a second detection unit 250, a speech synthesis unit 260, a ratio calculation unit 270 and an output unit 280. Each of the basic dictionary database 205, the first dictionary database 208 and the second registration unit 230 is achieved by a storage device such as a hard disk drive 1040 to be described later. The other units are achieved, respectively, by operations of a CPU 1000 to be described later based on commands of a program.

The first registration unit 200 receives the input text 100 and registers in a first dictionary for speech recognition at least one of the words included in the input text 100. Specifically, the first registration unit 200 reads a dictionary previously prepared for speech recognition from the basic dictionary database 205. In the basic dictionary, each word is associated with pronunciation data thereof for speaking the words in the basic dictionary). Thereafter, the basic dictionary database 205 selects a word included in the input text 100 from the dictionary and stores the word together with pronunciation data thereof, as the first dictionary, in the first dictionary database 208.

In the case where words not registered in the dictionary in the basic dictionary database 205 (hereinafter referred to as unknown words) are included in the input text 100, the first registration unit 200 generates a synthetic speech for the unknown words by use of a speech synthesis technique and adds a character string of the unknown words and the synthetic speech in association with each other to the first dictionary. The first recognition unit 210 receives the input speech data 110, uses the first dictionary stored in the first dictionary database 208 to perform speech recognition of a speech generated by reproducing the input speech data 110 and thus generates a first recognition text that is a text in which contents of the speech are recognized.

Since various techniques have been studied for the speech recognition, other documents can be referred to for details thereof. Here, a basic idea of speech recognition will be briefly described. At the same time, description will be given of how to utilize the speech recognition in this embodiment. As the basic concept of the speech recognition technique, first, respective portions of inputted speech data are compared with speech data of the respective words registered in the first dictionary. Thereafter, when a certain portion of the inputted speech data matches with speech data of any word, the portion is determined to have pronounced the word.

The matching includes not only perfect matching but also a certain level of approximation. Moreover, the speech data does not always have to be speech frequency data but may be data converted for abstraction thereof. Furthermore, for recognition of a certain word, not only the word but also contexts before and after the word may be taken into consideration. Either way, it is found out, as a result of application of the speech recognition technique, which word each portion of the inputted speech data pronounces.

The speech recognition technique is intended to output a text as a result of recognition. Thus, it is not necessary to output even information indicating which portion of the speech data corresponds to which word. However, as described above, even such information is often generated by the internal process. The first recognition unit 210 generates time stamp data indicating time at which each word is pronounced, based on such information used in the internal process, and outputs the time stamp data to the second recognition unit 240. Specifically, the time stamp data indicates pronunciation starting and ending times estimated from start of reproduction of the input speech data 110 for each of the words included in the input text 100.

Note that the speech recognition processing by the first recognition unit 210 is performed for each preset unit speech included in the input speech data 110. Moreover, it is desirable that the first recognition text is generated for each unit. This preset unit is, for example, a sentence. To be more specific, the first recognition unit 210 detects silent portions which are continued for a preset base time or longer among the input speech data 110, and divides the input speech data 110 into a plurality of sentences by using the silent portions as boundaries. Thereafter, the first recognition unit 210 performs the above processing for each of the sentences. Thus, erroneous recognition of a certain sentence is prevented from influencing the other sentences. As a result, a recognition rate can be increased.

Since processing to be described below is approximately the same for the first recognition texts of the respective sentences, one first recognition text will be described below as a representative thereof unless otherwise specified.

The first detection unit 220 receives the input text 100 and compares the input text 100 with the first recognition text received from the first recognition unit 210. Thereafter, the first detection unit 220 detects, from the input text 100, a first erroneous recognition text that is a text different from the first recognition text. Specifically, the first erroneous recognition text is a text having a correct content, which corresponds to portions erroneously recognized by the first recognition unit 210. The first erroneous recognition text is outputted to the second registration unit 230, the second recognition unit 240 and the second detection unit 250. Note that the first detection unit 220 may detect, as the first erroneous recognition text, the entire sentence including a text different from the first recognition text in the input text 100. Furthermore, in this case, when a plurality of continuous sentences include erroneously recognized portions, respectively, the first detection unit 220 may collectively detect, as the first erroneous recognition text, a plurality of sentences in the input text 100 corresponding to the plurality of sentences.

The second registration unit 230 registers in a second dictionary for speech recognition at least one of the words included in the first erroneous recognition text. Specifically, the second dictionary may be generated by use of the first dictionary. For example, the second registration unit 230 may read the first dictionary from the first dictionary database 208, remove at least one word that is included in the input text 100 but not included in the first erroneous recognition text from the read first dictionary, and store the word in the second dictionary database 235. Thus, words included in the first erroneous recognition text and also in the basic dictionary are associated with a speech stored in the basic dictionary, and unknown words included in the first erroneous recognition text are associated with a synthetic speech thereof. Thereafter, those words are stored in the second dictionary database 235.

The second recognition unit 240 specifies a speech that reproduces portions corresponding to the first erroneous recognition text among the input speech data 110. To be more specific, the second recognition unit 240 selects, based on the time stamp data received from the first recognition unit 210, ending time of a speech corresponding to a word immediately before the first erroneous recognition text and starting time of a speech corresponding to a word immediately after the first erroneous recognition text. Next, the second recognition unit 240 selects, from the input speech data 110, speech data of a speech pronounced between the ending time and the starting time. This speech data is set to be the portions corresponding to the first erroneous recognition text. Thereafter, the second recognition unit 240 uses words in the second dictionary stored in the second dictionary database 235, in conjunction with the pronunciation data and/or synthetic speech associated with the words stored in the second dictionary, to perform speech recognition of a speech that has reproduced the portions described above. Thus, the second recognition unit 240 generates a second recognition text that is a text in which contents of the speech are recognized Since a brief summary of the speech recognition technique has been given above, description thereof will be omitted. Moreover, as in the case of the first recognition unit 210 described above, the second recognition unit 240 generates time stamp data based on information generated by an internal process of speech recognition, and outputs the generated time stamp data together with the time stamp data received from the first recognition unit 210 to the output unit 280. The second detection unit 250 compares the second recognition text with the first erroneous recognition text described above. Thereafter, the second detection unit 250 detects, from the first erroneous recognition text, a second erroneous recognition text that is a text different from the second recognition text. The second erroneous recognition text is not only a different portion but may also be an entire sentence including the different portion.

The speech synthesis unit 260 determines the pronunciation timing of each of words included in a text for which the pronunciation timing cannot be recognized by the speech recognition technique. The text for which the pronunciation timing cannot be recognized by the speech recognition technique is, for example, the second erroneous recognition text described above. Alternatively, the speech synthesis unit 260 may detect the word pronunciation timing for the first erroneous recognition text itself or at least a part thereof without the processing executed by the second recognition unit 240 and the like. Hereinafter, description will be given of an example where the second erroneous recognition text is to be processed.

First, the speech synthesis unit 260 receives the second erroneous recognition text and generates a synthetic speech corresponding to the received second erroneous recognition text. Since various techniques have also been studied for speech synthesis, other documents can be referred to for details thereof. Here, a basic idea of speech synthesis will be briefly described. At the same time, description will be given of how to utilize the speech synthesis in this embodiment.

As the basic concept of the speech synthesis technique, first, respective portions of a received text are compared with a character string previously registered in a dictionary for speech synthesis. In this dictionary, character strings of words and speech data thereof are associated with each other. Thereafter, when a certain word in the received text matches with a character string registered in the dictionary for any of the words, the word is determined to be pronounced by speech data corresponding to the character string. Thus, by retrieving the speech data corresponding to the respective words in the received text from the dictionary, a synthetic speech of the text is generated.

The matching includes not only perfect matching but also a certain level of approximation. Moreover, for generation of a synthetic speech for a certain word, not only the word but also contexts before and after the word may be taken into consideration. Either way, it is found out, as a result of application of the speech synthesis technique, how the respective words included in the received text should be pronounced.

The speech synthesis technique is intended to generate the synthetic speech. Thus, the speech data retrieved for the respective words may be combined and outputted. However, as described above, in the internal process of the speech synthesis, speech data indicating synthetic pronunciation of each word is associated with the word. The speech synthesis unit 260 according to this embodiment outputs to the ratio calculation unit 270 such speech data which is obtained by the internal process and associated with each word. The ratio calculation unit 270 calculates, based on the speech data, a ratio between the respective pronunciation times of a plurality of words included in the second erroneous recognition text in the synthetic speech, and outputs the calculation result together with the second erroneous recognition text to the output unit 280.

The output unit 280 associates each of the plurality of words included in the second erroneous recognition text with a part of time to reproduce portions corresponding to the second erroneous recognition text in the input speech data 110 according to the calculated ratio. Thereafter, the output unit 280 outputs the obtained data. In the case where there are a plurality of second erroneous recognition texts, the above processing is performed for each of the texts. Moreover, the output unit 280 further outputs time stamp data concerning a text having erroneously recognized portions removed therefrom, among the time stamp data generated by the first recognition unit 210 and the second recognition unit 240. In this time stamp data, specifically, words that match with the first or second recognition text among the words included in the input text 100 are associated with reproduction time of a speech in which the words are recognized by the first recognition unit 210 and the second recognition unit 240. The data thus outputted is collectively called the time stamp data 105. Moreover, the output unit 280 may further output the input speech data 110 itself and the input text 100 itself in addition to the data described above.

Figure 6:
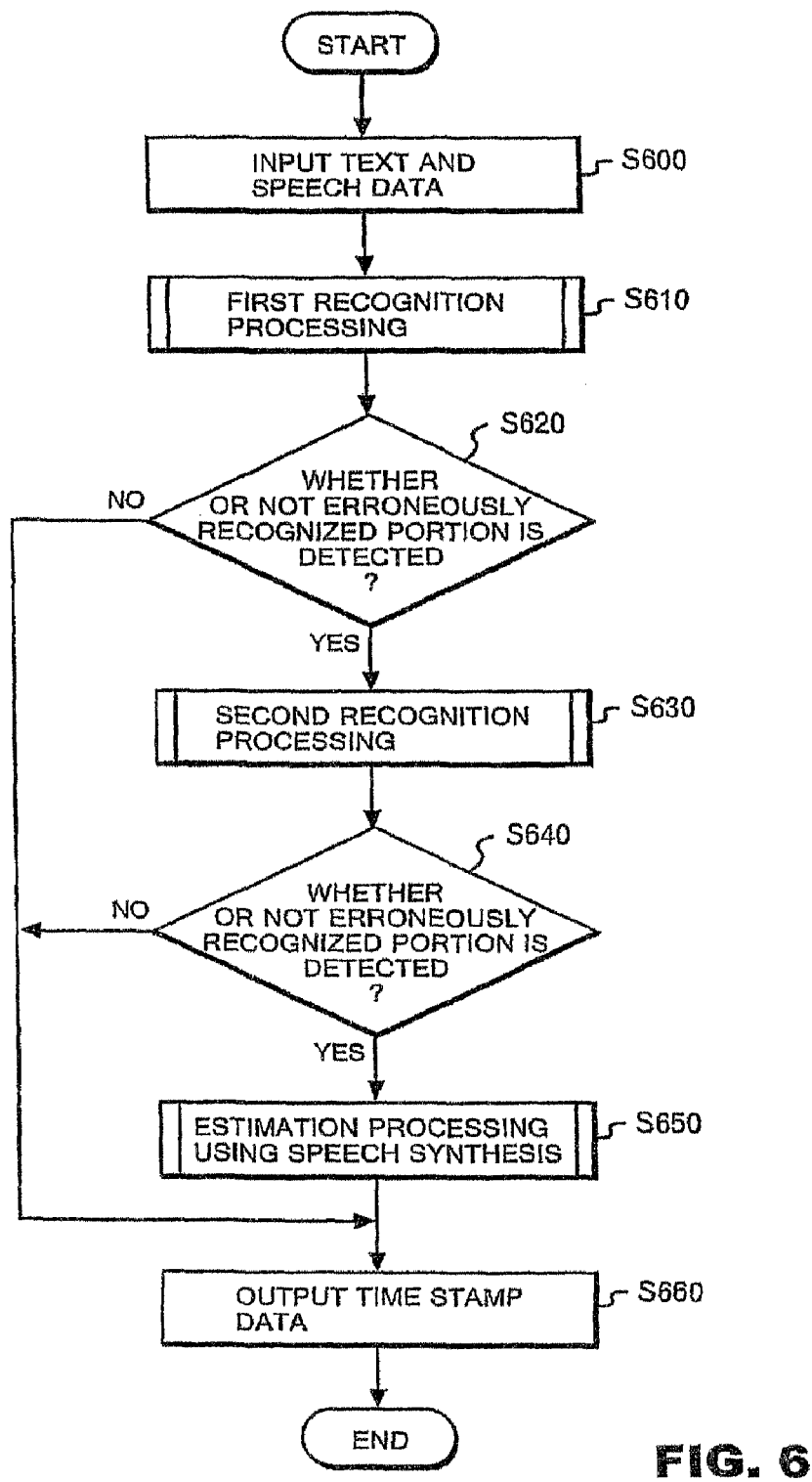
FIGS. 6-9 are flowcharts showing processing of generating the time stamp data by the synchronization system of FIG. 5, according to embodiments of the present invention.

FIG. 6 is a flowchart showing processing of generating the time stamp data 105 by the synchronization system 20 according to this embodiment. The synchronization system 20 first receives the input text 100 and the input speech data 110 (S600). For the received input text 100, the synchronization system 20 may perform preprocessing for enabling subsequent processing. For example, when the input text 100 is described in a language for which separation of words is not specified, the synchronization system 20 detects separation of words by performing a morphological analysis for the input text 100. Moreover, in the case where the input text 100 includes a plurality of sentences, the synchronization system 20 may perform processing called grammar registration for dividing the input text 100 by each sentence and temporarily storing the text in a storage device. Furthermore, the synchronization system 20 may delete characters not to be read (silent characters) from the input text 100 or may perform predetermined conversion for characters indicating numerical values in the input text 100.

Next, the first recognition unit 210 performs first recognition processing (S610). By this processing, the input speech data 110 is subjected to speech recognition and a first recognition text that is the recognition result is compared with the input text 100. In the case where erroneously recognized portions are included in the first recognition text, in other words, where a first erroneous recognition text different from the first recognition text is detected from the input text 100 (S620: YES), the second recognition unit 240 performs second recognition processing (S630). By this processing, a speech corresponding to the first erroneous recognition text is subjected to speech recognition and a second recognition text that is the recognition result is compared with the first erroneous recognition text.

In the case where erroneously recognized portions are included in the second recognition text, in other words, where a second erroneous recognition text different from the second recognition text is detected from the first erroneous recognition text (S640: YES), the speech synthesis unit 260 and the ratio calculation unit 270 perform estimation processing by use of the speech synthesis technique (S650). Thereafter, the output unit 280 generates the time stamp data 105 by combining the recognition result obtained by the first recognition unit 210, the recognition result obtained by the second recognition unit 240 and the estimation result obtained by the speech synthesis unit 260 and the ratio calculation unit 270, and outputs the time stamp data (S660). This time stamp data 105 is data in which at least one of a starting time and an ending time in respective times obtained by dividing reproduction time of the input speech data 110 by the ratio calculated by the ratio calculation unit 270 is associated with a word pronounced at the time.

Figure 7:
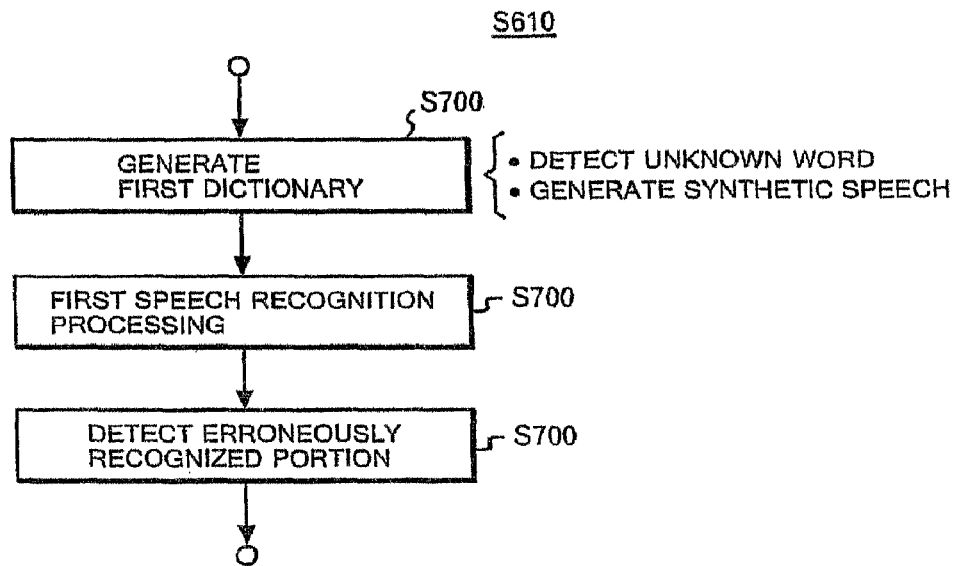

FIG. 7 shows details of the processing in S610. The first registration unit 200 receives the input text 100 and registers in the first dictionary for speech recognition at least one of the words included in the input text 100 (S700). This processing is performed for the entire input text 100 even if the input text 100 includes a plurality of sentences. Specifically, the first registration unit 200 reads speech data corresponding to the respective words included in the input text 100 from the basic dictionary database 205, and generates speech data of a synthetic speech corresponding to unknown words included in the input text 100 by performing speech synthesis. Thereafter, the first registration unit 200 stores the generated speech data in the first dictionary database 208.

Next, the first recognition unit 210 uses the first dictionary stored in the first dictionary database 208 to perform speech recognition of a speech generated by reproducing the received input speech data 110, and thus generates a first recognition text that is a text in which contents of the speech are recognized (S710). In this process, the first recognition unit 210 generates time stamp data indicating time at which each of the recognized words is reproduced in the input speech data 110. These processes are performed for each of the sentences included in the input speech data 110. Thereafter, the first detection unit 220 compares the received input text 100 with each of the first recognition texts received from the first recognition unit 210 (S720). For each of the first recognition texts, the first detection unit 220 detects from the input text 100 a first erroneous recognition text that is a text different from the first recognition text.

Figure 8:
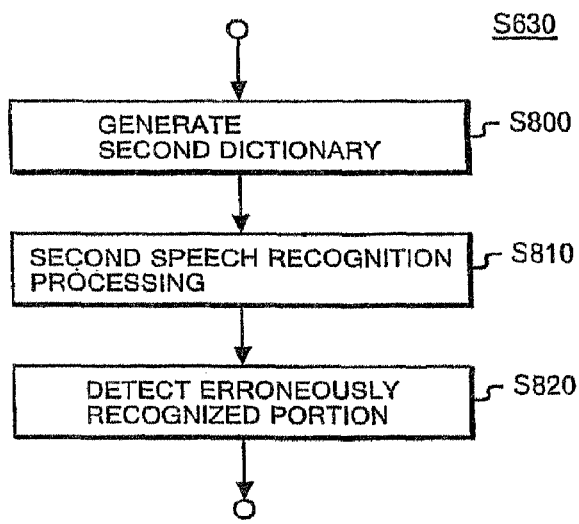

FIG. 8 shows details of the processing in S630. The synchronization system 20 performs the following processing for each of the first erroneous recognition texts. First, the second registration unit 230 registers in the second dictionary for speech recognition at least one of the words included in the first erroneous recognition text (S800). To be more specific, the second registration unit 230 selects from the basic dictionary speech data corresponding to words included in the first erroneous recognition text and also in the basic dictionary, generates speech data of a synthetic speech of unknown words included in the first erroneous recognition text, and stores the data in the second dictionary database 235.

Next, the second recognition unit 240 uses the dictionary stored in the second dictionary database 235 to perform speech recognition of a speech reproducing portion corresponding to the first erroneous recognition text, and thus generates a second recognition text that is a text in which contents of the speech are recognized (S810). Next, the second detection unit 250 compares the second recognition text with the first erroneous recognition text described above (S820). Thereafter, the second detection unit 250 detects from the first erroneous recognition text a second erroneous recognition text that is a text different from the second recognition text.

In order to improve accuracy of speech synthesis in the subsequent speech synthesis processing for the second erroneous recognition text, it is preferable that the second detection unit 250 may detect, as the second erroneous recognition text, a preset unit of character string of including a text different from the second recognition text in the first erroneous recognition text. The character string of the preset unit is, for example, a grammatical "sentence". The speech synthesis is often performed by taking into consideration not independent words but contexts sentence by sentence. Thus, the accuracy of speech synthesis can be accordingly improved.

Figure 9:
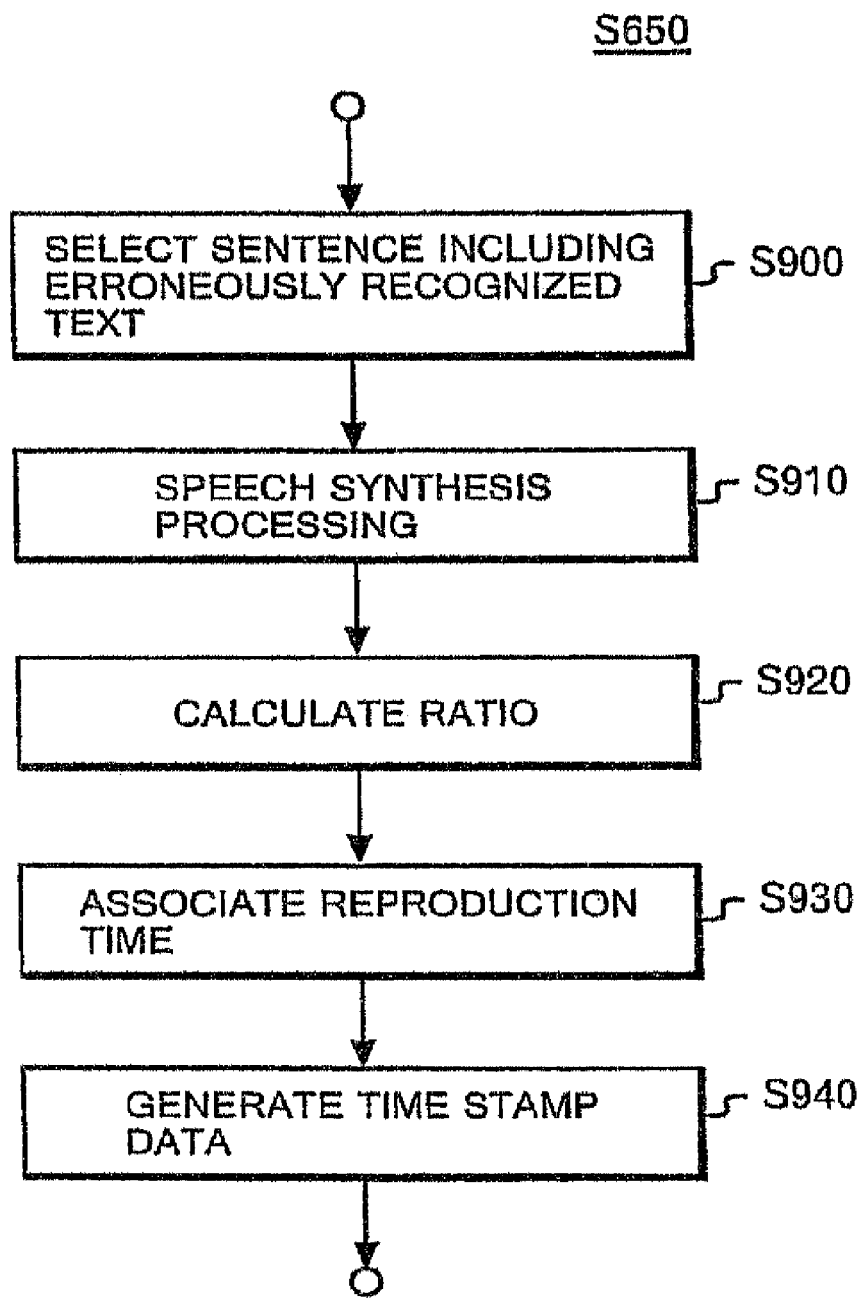

FIG. 9 shows details of the processing in S650. The speech synthesis unit 260 selects a text including at least an erroneously recognized text, for example, the second erroneous recognition text described above (S900). Thereafter, the speech synthesis unit 260 generates a synthetic speech corresponding to the selected second erroneous recognition text (S910). In this speech synthesis process, the speech synthesis unit 260 generates data indicating to which portion of the synthetic speech each of the words included in the input text 100 corresponds.

Figure 10:
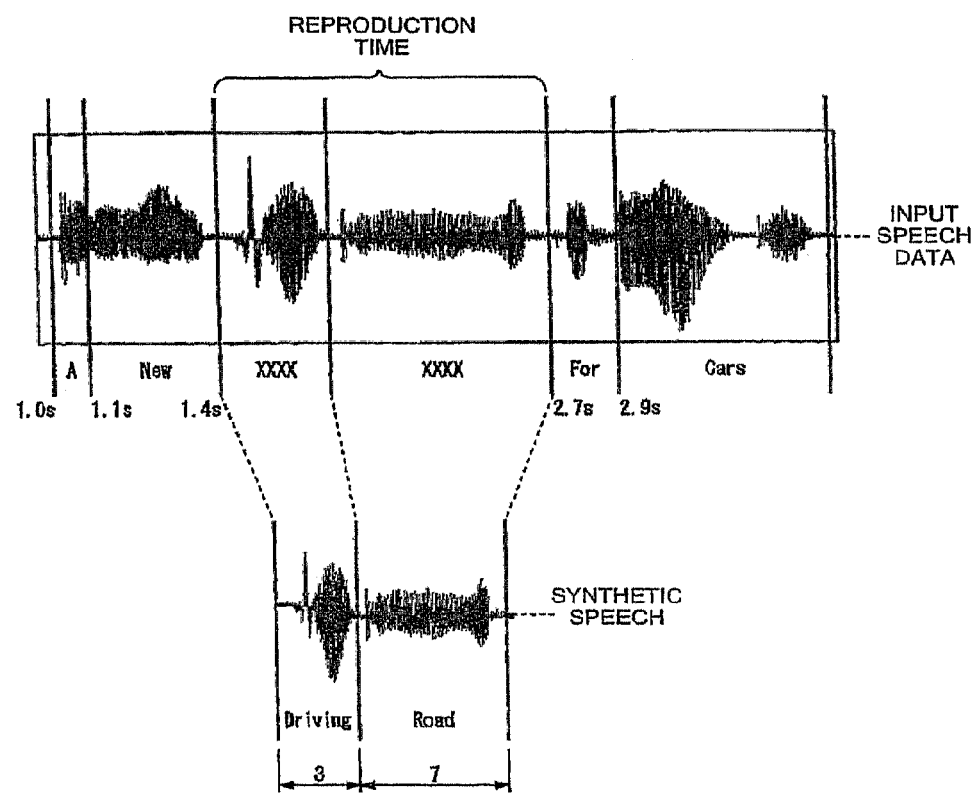
FIG. 10 schematically shows processing of associating reproduction time with words based on a calculated ratio, according to embodiments of the present invention.

Subsequently, the ratio calculation unit 270 calculates, based on the data thus generated, a ratio between the respective pronunciation times of a plurality of words in the second erroneous recognition text in the generated synthetic speech, the words being different from the second recognition text (S920). Specifically, although the speech synthesis is performed for the entire sentence including erroneously recognized portions, the ratio of the pronunciation time is calculated only for the plurality of erroneously recognized words. Thereafter, the output unit 280 associates each of the plurality of words with a part of time to reproduce portions corresponding to the plurality of words in the input speech data 110 according to the calculated ratio (S930). FIG. 10 schematically shows this processing.

FIG. 10 schematically shows the processing of associating each word with reproduction time based on the calculated ratio (S930). In this example shown in FIG. 10, a speech reading the text "A New Driving Road For Cars" is shown in the upper part of FIG. 10. In this reading speech, a portion corresponding to "Driving Road" is erroneously recognized by the speech recognition processing. Therefore, although reproduction time for the entire character string "Driving Road" is found out based on recognition results of the words before and after the character string, it is impossible to know at what time the respective words "Driving" and "Road" are to be reproduced.

Meanwhile, the speech synthesis unit 260 generates a synthetic speech by performing speech synthesis for a text including at least the erroneously recognized character string "Driving Road". This synthetic speech is shown in the lower part of FIG. 10. The ratio calculation unit 270 calculates 3:7 for a ratio between pronunciation times of "Driving" and "Road" in the synthetic speech. Thus, the output unit 280 associates the time to reproduce the entire "Driving Road" in the input speech data 110 with the pronunciation time of "Driving" and the pronunciation time of "Road," at the ratio of 3:7. Thereafter, the output unit 280 outputs the obtained data. Note that the ratio calculation unit 270 does not have to directly set the calculated ratio to be the ratio of reproduction time. The ratio of reproduction time may be set by subjecting the calculated ratio to predetermined weighting as long as the ratio corresponds to the calculated ratio.

Referring back to FIG. 9, the output unit 280 generates time stamp data corresponding to the entire input text 100 by adding time stamp data concerning a text having erroneously recognized portions removed therefrom among the time stamp data generated by the first recognition unit 210 and the second recognition unit 240 to the data indicating the association as described above (S940).

As described above with reference to FIGS. 1 to 10, the synchronization system 20 according to this embodiment enables correct the detection of pronunciation timings of more words by performing speech recognition more than once for the same speech data. Particularly, words included in a speech that cannot be recognized in first speech recognition are registered in a dictionary for subsequent speech recognition. Thus, the subsequent speech recognition processing is specialized in recognition of the speech. As a result, recognition accuracy can be improved. Furthermore, as to words that cannot be correctly recognized even by performing the speech recognition more than once, pronunciation timings thereof can be accurately estimated by use of the speech synthesis technique.

This estimation processing results in the following effects. First, as to time at which each word is pronounced by speech synthesis, not the actual time but a ratio of the time is used as the estimation result. Therefore, even in the case where the speech synthesis technique to be used is for general purposes and not at all related to the input speech data 110, such as a case where the entire synthetic speech is reproduced slowly compared with reproduction of the input speech data 110, the pronunciation timing can be accurately estimated. Thus, if both of a speech recognition engine and a speech synthesis engine can be prepared, accurate estimation of pronunciation timings can be achieved for a wide variety of languages.

Figure 11:
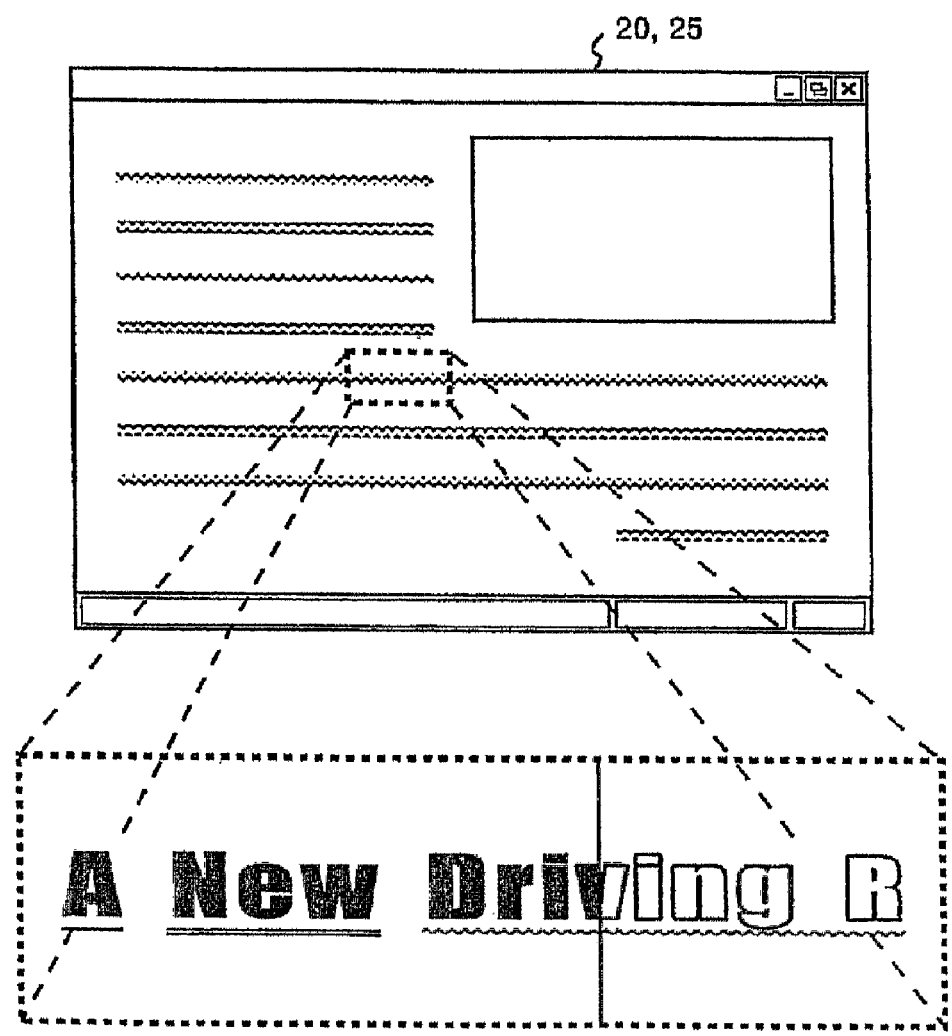
FIG. 11 shows an example of a screen displayed based on the time stamp data by the synchronization system of FIG. 5, according to embodiments of the present invention.

Moreover, in the speech recognition processing, words for which pronunciation timings cannot be detected may be generated. Meanwhile, by utilizing the speech synthesis, pronunciation timings for all the words can be set. As a result, since there are no portions with unknown pronunciation timings, application in a wide range of fields is possible. FIG. 11 shows an example thereof.

FIG. 11 shows an example of a screen displayed based on the time stamp data by the synchronization system 20 or the display device 25 according to this embodiment. The synchronization system 20 displays the input text 100 in synchronization with the input speech data 110 for clearly showing a result of editing to the editor of pronunciation timing, for example. Moreover, the display device 25 displays the input text 100 in synchronization with reproduction of the input speech data 110 for making it easier for the general user to understand the contents of the input speech data 110, for example.

Here, the description will be continued by assuming that the output unit 280 in the synchronization system 20 displays the screen as a representative of the display processing by the synchronization system 20 or the display device 25. The output unit 280 displays the input text 100 on a screen. The input text 100 may be, for example, a text generated by language learning software or other general web page. At the same time, the output unit 280 sequentially outputs speeches by reproducing the input speech data 110.

Moreover, the output unit 280 measures an elapsed time after the start of reproduction of the input speech data 110. Thereafter, the output unit 280 retrieves a word corresponding to the elapsed time from the time stamp data 105. For example, in the example shown in FIG. 4, when the elapsed time is 1.5 seconds, the word "Driving" is retrieved, which includes the time between the starting time and the ending time. Subsequently, the output unit 280 displays the retrieved word so that the word can be distinguished from other words. In the example shown in FIG. 11, specifically, the words pronounced before the retrieved word and the words after the retrieved word are displayed in different colors from each other.

The retrieved word itself is colored in the same color as that of those pronounced before the retrieved word sequentially from the left character according to the course of pronunciation of the word. Instead of this coloring example, the output unit 280 may change the font of the retrieved word or may display the retrieved word while moving the characters thereof on the screen.

In addition, the output unit 280 in the synchronization system 20 may display the words included in the input text 100 to the editor of pronunciation timing by attaching different underlines to the respective words. For example, a single underline indicates that underlined words are correctly recognized by the first recognition unit 210, in other words, not included in any erroneous recognition text. Moreover, a double underline indicates that underlined words are correctly recognized by the second recognition unit 240, in other words, included in the first erroneous recognition text but not included in the second erroneous recognition text. Furthermore, a wavy line indicates that words with the wavy line attached thereto have pronunciation timings estimated by the speech synthesis unit 260, in other words, are included in the second erroneous recognition text.

By displaying the recognition results so that the word can be distinguished from each other as described above, the editor can use the results for subsequent editing work by understanding how the pronunciation timings of the respective words are set. For example, the words correctly recognized by the first recognition unit 210 can be understood to have very high reliability for their pronunciation timings.

Figure 12:
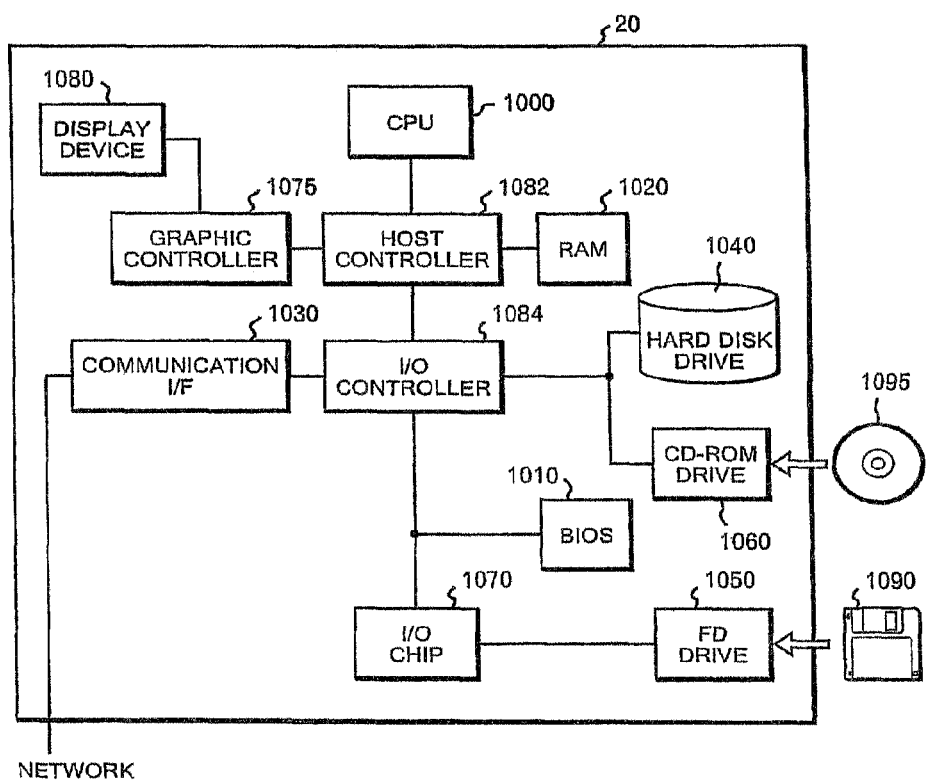
FIG. 12 shows an example of a hardware configuration of a computer which functions as the synchronization system of FIG. 5, according to embodiments of the present invention.

FIG. 12 shows an example of a hardware configuration of a computer which functions as the synchronization system 20 according to this embodiment. The synchronization system 20 includes: a CPU peripheral part having a CPU 1000, a RAM 1020 and a graphic controller 1075, which are connected to each other by a host controller 1082; a communication interface 1030 connected to the host controller 1082 through an input-output controller 1084; an input-output part having a hard disk drive 1040 and a CD-ROM drive 1060; and a legacy input-output part having a ROM 1010, a flexible disk drive 1050 and an input-output chip 1070, which are connected to the input-output controller 1084.

The host controller 1082 connects between the RAM 1020, the CPU 1000 which accesses the RAM 1020 at a high transfer rate, and the graphic controller 1075. The CPU 1000 controls the respective parts by operating based on programs stored in the ROM 1010 and the RAM 1020. The graphic controller 1075 acquires image data generated on a frame buffer provided in the RAM 1020 by the CPU 1000 and the like, and displays the image data on a display device 1080. Alternatively, the graphic controller 1075 may include therein a frame buffer for storing the image data generated by the CPU 1000 and the like.

The input-output controller 1084 connects the host controller 1082 to the communication interface 1030 as a relatively high-speed input-output device, the hard disk drive 1040 and the CD-ROM drive 1060. The communication interface 1030 communicates with external devices through a network. The hard disk drive 1040 stores programs and data to be used by the synchronization system 20. The CD-ROM drive 1060 reads programs or data from a CD-ROM 1095 and provides the read programs or data to the RAM 1020 or the hard disk drive 1040.

Moreover, the ROM 1010 and a relatively low-speed input-output device such as the flexible disk drive 1050 and the input-output chip 1070 are connected to the input-output controller 1084. The ROM 1010 stores a boot program executed by the CPU 1000 when the synchronization system 20 is started, a program dependent on the hardware of the synchronization system 20, and the like. The flexible disk drive 1050 reads programs or data from a flexible disk 1090 and provides the read programs or data to the RAM 1020 or the hard disk drive 1040 through the input-output chip 1070. The input-output chip 1070 connects the respective input-output devices through the flexible disk 1090 or, for example, a parallel port, a serial port, a keyboard port, a mouse port and the like.

The programs to be provided to the synchronization system 20 are stored in a recording medium, such as the flexible disk 1090, the CD-ROM 1095 and an IC card, to be provided by the user. The programs are read from the recording medium through the input-output chip 1070 and/or the input-output controller 1084, installed into the synchronization system 20 and executed therein. Since operations that the program allows the synchronization system 20 and the like to operate are the same as those executed by the synchronization system 20 described with reference to FIGS. 1 to 11, description thereof will be omitted.

The programs described above may be stored in an external storage medium. As the storage medium, an optical recording medium such as a DVD and a PD, a magnetooptical recording medium such as an MD, a tape medium, a semiconductor memory such as the IC card, and the like can be used besides the flexible disk 1090 and the CD-ROM 1095. Moreover, the programs may be provided to the synchronization system 20 through the network by using a hard disk provided in a server system connected to a dedicated communication network or the Internet or a storage device such as a RAM as the recording medium.

Note that, since a hardware configuration of the display device 25 according to this embodiment is also approximately the same as the hardware configuration of the synchronization system 20 shown in FIG. 12, description thereof will be omitted.

Although the present invention has been described above by use of the embodiment, the technical scope of the present invention is not limited to that described in the foregoing embodiment. It is apparent to those skilled in the art that various changes or modifications can be added to the foregoing embodiment. It is apparent from the description of the scope of claims that embodiments to which such changes or modifications are added can also be included in the technical scope of the present invention.

The invention claimed is:

1. A method for synchronizing words in an input text of a speech with a recording of the speech, comprising:
    performing, by a processor of a computer system, speech recognition of input speech data representing the speech, by comparing the input speech data with pronunciation speech data associated with the input text, to generate a recognition text comprising recognized words of the input text;
    determining, by the processor of the computer system, by comparing the input text with the recognition text, an erroneous recognition text comprising words of the input text not matching respective words of the recognition text;

generating, by the processor of the computer system, synthetic speech data corresponding to the erroneous recognition text;

computing, by the processor of the computer system, from the input speech data to which each word of the synthetic speech data corresponds, ratio data comprising a ratio of a pronunciation time in the input speech data of each word of the erroneous recognition text to a pronunciation time in the input speech data of each other word of the erroneous recognition text; and determining, by the processor of the computer system, based on the computed ratio data, an association between each word of the erroneous recognition text and a time to reproduce the input speech data corresponding to said each word of the erroneous recognition text.

2. The method of claim 1, further comprising:

generating a first dictionary stored in a first dictionary database, said first dictionary comprising the words in the input text and the associated pronunciation speech data.

3. The method of claim 2, wherein said generating the first dictionary comprises:

providing a basic dictionary stored in a basic dictionary database of the computer system, said basic dictionary comprising words and pronunciation data associated with each word of the basic dictionary for speaking each word of the basic dictionary;

comparing the words in the input text with the words in the basic dictionary to determine words in the input text matching same words in the basic dictionary;

for each matched word in the input text matching a same word in the basic dictionary, inserting the same word and the associated pronunciation data in the first dictionary, wherein the words in the first dictionary comprise each inserted same word, wherein the first pronunciation speech data in the first dictionary comprises the inserted associated pronunciation data.

4. The method of claim 3, wherein said generating the first dictionary further comprises:

for each unmatched word in the input text not matching any word in the basic dictionary, generating associated synthetic speech data and inserting each unmatched word with its associated synthetic speech data in the first dictionary, wherein the words in the first dictionary further comprise each inserted unmatched word, wherein the first pronunciation speech data in the first dictionary further comprises the inserted associated synthetic speech data.

5. The method of claim 1, further comprising:

generating, from analysis of the input speech data, time stamp data comprising a starting time and an ending time in the input speech data at which the pronunciation speech data for each word of the recognition text was spoken by the speaker; and generating, through use of the generated time stamp data, the input speech data corresponding to the erroneous recognition text.

6. The method of claim 1, further comprising:

recording the association in a recording medium and/or displaying the association on a display device.

7. The method of claim 1, further comprising:

performing speech recognition of the input speech data corresponding to the erroneous recognition text to generate a second recognition text, determining, by comparing the second recognition text with the erroneous recognition text, a second erroneous recognition text, and computing the ratio data based at least in part on the second erroneous recognition text.

8. A computer program product, comprising a computer-readable storage device having a computer-readable program code stored therein, said computer-readable program code containing instructions that, when executed by a processor of a computer system, implement a method for synchronizing words in an input text of a speech with a recording of the speech, said method comprising:

performing speech recognition of input speech data representing the speech, by comparing the input speech data with pronunciation speech data associated with the input text, to generate a recognition text comprising recognized words of the input text;

determining, by comparing the input text with the recognition text, an erroneous recognition text comprising words of the input text not matching respective words of the recognition text;

generating synthetic speech data corresponding to the erroneous recognition text;

computing, from the input speech data to which each word of the synthetic speech data corresponds, ratio data comprising a ratio of a pronunciation time in the input speech data of each word of the erroneous recognition text to a pronunciation time in the input speech data of each other word of the erroneous recognition text; and determining, based on the computed ratio data, an association between each word of the erroneous recognition text and a time to reproduce the input speech data corresponding to said each word of the erroneous recognition text.

9. The computer program product of claim 8, further comprising:

generating a first dictionary stored in a first dictionary database, said first dictionary comprising the words in the input text and the associated pronunciation speech data.

10. The computer program product of claim 9, wherein said generating the first dictionary comprises:

providing a basic dictionary stored in a basic dictionary database of the computer system, said basic dictionary comprising words and pronunciation data associated with each word of the basic dictionary for speaking each word of the basic dictionary;

comparing the words in the input text with the words in the basic dictionary to determine words in the input text matching same words in the basic dictionary;

for each matched word in the input text matching a same word in the basic dictionary, inserting the same word and the associated pronunciation data in the first dictionary, wherein the words in the first dictionary comprise each inserted same word, wherein the first pronunciation speech data in the first dictionary comprises the inserted associated pronunciation data.

11. The computer program product of claim 10, wherein generating the first dictionary further comprises:

for each unmatched word in the input text not matching any word in the basic dictionary, generating associated synthetic speech data and inserting each unmatched word with its associated synthetic speech data in the first dictionary, wherein the words in the first dictionary further comprise each inserted unmatched word, wherein the first pronunciation speech data in the first dictionary further comprises the inserted associated synthetic speech data.

12. The computer program product of claim 8, further comprising:
generating, from analysis of the input speech data, time stamp data comprising a starting time and an ending time in the input speech data at which the pronunciation speech data for each word of the recognition text was spoken by the speaker; and
generating, through use of the generated time stamp data, the input speech data corresponding to the erroneous recognition text.

13. The computer program product of claim 8, further comprising:
recording the association in a recording medium and/or displaying the association on a display device.

14. The computer program product of clam 8, further comprising:
performing speech recognition of the input speech data corresponding to the erroneous recognition text to generate a second recognition text, determining, by comparing the second recognition text with the erroneous recognition text, a second erroneous recognition text, and computing the ratio data based at least in part on the second erroneous recognition text.

15. A computer system comprising:
a processor and a computer-readable memory unit coupled to the processor, said memory unit containing instructions that, when executed by the processor, implement a method for synchronizing words in an input text of a speech with a recording of the speech, said method comprising:
performing speech recognition of input speech data representing the speech, by comparing the input speech data with pronunciation speech data associated with the input text, to generate a recognition text comprising recognized words of the input text;
determining, by comparing the input text with the recognition text, an erroneous recognition text comprising words of the input text not matching respective words of the recognition text;
generating synthetic speech data corresponding to the erroneous recognition text;
computing, from the input speech data to which each word of the synthetic speech data corresponds, ratio data comprising a ratio of a pronunciation time in the input speech data of each word of the erroneous recognition text to a pronunciation time in the input speech data of each other word of the erroneous recognition text; and
determining, based on the computed ratio data, an association between each word of the erroneous recognition text and a time to reproduce the input speech data corresponding to said each word of the erroneous recognition text.

16. The computer system of claim 15, further comprising:
generating a first dictionary stored in a first dictionary database, said first dictionary comprising the words in the input text and the associated pronunciation speech data.

17. The computer system of claim 16, wherein said generating the first dictionary comprises:
providing a basic dictionary stored in a basic dictionary database of the computer system, said basic dictionary comprising words and pronunciation data associated with each word of the basic dictionary for speaking each word of the basic dictionary;
comparing the words in the input text with the words in the basic dictionary to determine words in the input text matching same words in the basic dictionary;
for each matched word in the input text matching a same word in the basic dictionary, inserting the same word and the associated pronunciation data in the first dictionary,
wherein the words in the first dictionary comprise each inserted same word,
wherein the first pronunciation speech data in the first dictionary comprises the inserted associated pronunciation data.

18. The computer system of claim 17, wherein said generating the first dictionary further comprises: for each unmatched word in the input text not matching any word in the basic dictionary, generating associated synthetic speech data and inserting each unmatched word with its associated synthetic speech data in the first dictionary,
wherein the words in the first dictionary further comprise each inserted unmatched word,
wherein the first pronunciation speech data in the first dictionary further comprises the inserted associated synthetic speech data.

19. The computer system of claim 15, further comprising:
generating, from analysis of the input speech data, time stamp data comprising a starting time and an ending time in the input speech data at which the pronunciation speech data for each word of the recognition text was spoken by the speaker; and
generating, through use of the generated time stamp data, the input speech data corresponding to the erroneous recognition text.

20. The computer system of claim 15, further comprising:
recording the association in a recording medium and/or displaying the association on a display device.

21. The computer system of claim 15, further comprising:
performing speech recognition of the input speech data corresponding to the erroneous recognition text to generate a second recognition text, determining, by comparing the second recognition text with the erroneous recognition text, a second erroneous recognition text, and computing the ratio data based at least in part on the second erroneous recognition text.

* * * * *